United States Patent
Zhu et al.

(10) Patent No.: US 11,300,188 B2
(45) Date of Patent: Apr. 12, 2022

(54) GEAR-DOUBLE RING-HYDRAULIC HYBRID TRANSMISSION DEVICE

(71) Applicant: JIANGSU UNIVERSITY, Zhenjiang (CN)

(72) Inventors: Zhen Zhu, Zhenjiang (CN); Xiang Tian, Zhenjiang (CN); Yingfeng Cai, Zhenjiang (CN); Long Chen, Zhenjiang (CN); Changgao Xia, Zhenjiang (CN); Juncheng Wang, Zhenjiang (CN); Jiangyi Han, Zhenjiang (CN); Jianguo Zhu, Zhenjiang (CN); Rong Zou, Zhenjiang (CN); Lingxin Zeng, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/423,485

(22) PCT Filed: Aug. 14, 2020

(86) PCT No.: PCT/CN2020/109151
§ 371 (c)(1),
(2) Date: Jul. 16, 2021

(65) Prior Publication Data
US 2022/0042587 A1  Feb. 10, 2022

(30) Foreign Application Priority Data

Aug. 3, 2020 (CN) .......................... 202010766109.1

(51) Int. Cl.
*F16H 47/08* (2006.01)
*F16H 37/08* (2006.01)
(Continued)

(52) U.S. Cl.
CPC ............... *F16H 47/08* (2013.01); *B60K 6/54* (2013.01); *F16H 37/084* (2013.01); *F16H 2037/028* (2013.01); *F16H 2200/201* (2013.01)

(58) Field of Classification Search
None
See application file for complete search history.

(56) References Cited

U.S. PATENT DOCUMENTS 4,947,533 A * 8/1990 Taniguchi ................. B23B 5/46
29/894
5,884,535 A * 3/1999 Fukunaga ............. F16H 37/022
74/730.1

(Continued)

FOREIGN PATENT DOCUMENTS

| EP | 0563941 A1 | 10/1993 |
|----|------------|---------|
| GN | 111207198 A | 5/2020 |
| GN | 111237424 A | 6/2020 |

*Primary Examiner* — Colby M Hansen
(74) *Attorney, Agent, or Firm* — Bayramoglu Law Offices LLC

(57) ABSTRACT

A gear-double ring-hydraulic hybrid transmission device includes an input mechanism, a double ring series transmission mechanism, a hydraulic transmission mechanism, an output member, a front planetary gear mechanism, a middle planetary gear mechanism, a rear planetary gear mechanism, a clutch assembly, and a brake assembly. An output of the double ring series transmission mechanism is connected to the middle planetary gear mechanism. The clutch assembly connects the input mechanism to the double ring series transmission mechanism, the hydraulic transmission mechanism, and the front planetary gear mechanism, connects an output of the hydraulic transmission mechanism to the middle planetary gear mechanism, and connects an output of the rear planetary gear mechanism to the output member.

(Continued)

The clutch assembly and the brake assembly provide a continuous transmission ratio between the input mechanism and the output member.

10 Claims, 13 Drawing Sheets

(51) Int. Cl.
    *B60K 6/543*         (2007.10)
    *B60K 6/54*          (2007.10)
    *F16H 37/02*        (2006.01)

(56) References Cited

U.S. PATENT DOCUMENTS

| | | | |
|---|---|---|---|
| 6,543,311 B1* | 4/2003 | Baginski | B60K 6/46 |
| | | | 74/730.1 |
| 2009/0227408 A1* | 9/2009 | Imamura | B60W 20/10 |
| | | | 475/5 |
| 2011/0172051 A1* | 7/2011 | Hoffman | F16H 37/086 |
| | | | 475/207 |
| 2013/0130859 A1* | 5/2013 | Lundberg | F16H 37/022 |
| | | | 475/214 |
| 2016/0114668 A1* | 4/2016 | Zhang | B60K 6/12 |
| | | | 74/732.1 |

* cited by examiner

GEAR-DOUBLE RING-HYDRAULIC HYBRID TRANSMISSION DEVICE

CROSS REFERENCE TO THE RELATED APPLICATIONS

This application is the national phase entry of International Application No. PCT/CN2020/109151, filed on Aug. 14, 2020, which is based upon and claims priority to Chinese Patent Application No. 202010766109.1, filed on Aug. 3, 2020, the entire contents of which are incorporated herein by reference.

TECHNICAL FIELD

The present invention relates to the field of automatic transmission devices, and in particular, to a gear-double ring-hydraulic hybrid transmission device.

BACKGROUND

Gear transmission is high in efficiency, but has difficulty in meeting the requirements of stepless speed regulation; hydraulic transmission can meet the requirements of stepless speed regulation, but is low in efficiency and accuracy; and ring transmission are high in efficiency and accuracy, but has a limited transmission ratio adjustment range. Based on this, a variable-speed transmission device that integrates multiple transmission modes and can adapt to different working conditions has a good development prospect.

Hybrid transmission can carry forward the advantages of single-flow transmission, abandon its shortcomings, and become the development trend of variable-speed transmission devices. A transmission device that integrates multiple transmission modes and can implement hybrid transmission by freely combining the transmission modes will be a new trend in the design of variable-speed transmission devices.

SUMMARY

To eliminate the defects in the prior art, the present invention provides a gear-double ring-hydraulic hybrid transmission device, which integrates gear single-flow transmission, double ring single-flow transmission, hydraulic single-flow transmission, gear-double ring hybrid transmission, gear-hydraulic hybrid transmission, and double ring-hydraulic hybrid transmission, and can switch among the transmission modes.

The present invention achieves the above objective through the following technical solution.

A gear-double ring-hydraulic hybrid transmission device includes an input mechanism, a double ring series transmission mechanism, a hydraulic transmission mechanism, an output member, a front planetary gear mechanism, a middle planetary gear mechanism, a rear planetary gear mechanism, a clutch assembly, and a brake assembly, wherein the front planetary gear mechanism, the middle planetary gear mechanism, and the rear planetary gear mechanism are connected in series, an output of the double ring series transmission mechanism is connected to the middle planetary gear mechanism, and the clutch assembly connects the input mechanism to the double ring series transmission mechanism, the hydraulic transmission mechanism, and the front planetary gear mechanism, connects an output of the hydraulic transmission mechanism to the middle planetary gear mechanism, and connects an output of the rear planetary gear mechanism to the output member; the clutch assembly and the brake assembly are configured for providing a continuous transmission ratio between the input mechanism and the output member.

Further, transmission modes including gear single-flow transmission, double ring single-flow transmission, hydraulic single-flow transmission, gear-double ring hybrid transmission, gear-hydraulic hybrid transmission, and double ring-hydraulic hybrid transmission are provided between the input mechanism and the output member by adjusting a displacement ratio of the hydraulic transmission mechanism, adjusting a transmission ratio of the double ring series transmission mechanism, and selectively controlling engagement of the clutch assembly and the brake assembly.

Further, a planet carrier of the front planetary gear mechanism is connected to a planet carrier of the middle planetary gear mechanism, and a sun gear of the front planetary gear mechanism is connected to the output of the double ring series transmission mechanism; the planet carrier of the middle planetary gear mechanism is connected to a sun gear of the rear planetary gear mechanism, and a ring gear of the rear planetary gear mechanism is connected to the output member;

the clutch assembly includes a clutch $L_1$, a clutch $L_6$, and a clutch $L_7$, wherein the clutch $L_1$ is used for selectively connecting the input mechanism to a ring gear of the front planetary gear mechanism to achieve synchronous rotation; the clutch $L_6$ is used for selectively connecting a ring gear of the middle planetary gear mechanism to the sun gear of the front planetary gear mechanism to achieve synchronous rotation; the clutch $L_7$ is used for selectively connecting the sun gear of the rear planetary gear mechanism to a planet carrier of the rear planetary gear mechanism to achieve synchronous rotation, the brake assembly includes a brake $B_2$ and a brake $B_3$, wherein the brake $B_2$ is used for selectively connecting the ring gear of the middle planetary gear mechanism to a fixed member; and the brake $B_3$ is used for selectively connecting the planet carrier of the rear planetary gear mechanism to a fixed member;

forward gear single-flow transmission is provided between the input mechanism and the output member by engaging the clutch $L_1$, the clutch $L_6$, the clutch $L_7$, and the brake $B_2$; and reverse gear single-flow transmission is provided between the input mechanism and the output member by engaging the clutch $L_1$, the clutch $L_6$, the brake $B_2$, and the brake $B_3$.

Further, the clutch assembly further includes a clutch $L_2$ and a clutch $L_3$, wherein the clutch $L_2$ and the clutch $L_3$ are together used for selectively connecting the input mechanism to an input end of the double ring series transmission mechanism to achieve synchronous rotation; the brake assembly further includes a brake $B_1$, wherein the brake $B_1$ is used for selectively connecting the ring gear of the front planetary gear mechanism to a fixed member;

forward double ring single-flow transmission is provided between the input mechanism and the output member by adjusting the transmission ratio of the double ring series transmission mechanism and engaging the clutch $L_2$, the clutch $L_3$, the clutch $L_7$, and the brake $B_1$;

reverse double ring single-flow transmission is provided between the input mechanism and the output member by adjusting the transmission ratio of the double ring series transmission mechanism and engaging the clutch $L_2$, the clutch $L_3$, the brake $B_1$, and the brake $B_3$.

Further, the clutch assembly further includes a clutch $L_4$ and a clutch $L_5$, wherein the clutch $L_2$ and the clutch $L_4$ are together used for selectively connecting the input mechanism to an input end of the hydraulic transmission mechanism to achieve synchronous rotation; and the clutch $L_5$ is used for selectively connecting the output end of the hydraulic transmission mechanism to a sun gear of the middle planetary gear mechanism to achieve synchronous rotation;

forward hydraulic single-flow transmission is provided between the input mechanism and the output member by adjusting the displacement ratio of the hydraulic transmission mechanism and engaging the clutch $L_2$, the clutch $L_4$, the clutch $L_5$, the clutch $L_6$, the clutch $L_7$, and the brake $B_2$;

reverse hydraulic single-flow transmission is provided between the input mechanism and the output member by adjusting the displacement ratio of the hydraulic transmission mechanism and engaging the clutch $L_2$, the clutch $L_4$, the clutch $L_5$, the clutch $L_6$, the brake $B_2$, and the brake $B_3$.

Further, forward gear-double ring hybrid transmission is provided between the input mechanism and the output member by adjusting the transmission ratio of the double ring series transmission mechanism and engaging the clutch $L_1$, the clutch $L_2$, the clutch $L_3$, and the clutch $L_7$;

reverse gear-double ring hybrid transmission is provided between the input mechanism and the output member by adjusting the transmission ratio of the double ring series transmission mechanism and engaging the clutch $L_1$, the clutch $L_2$, the clutch $L_3$, and the brake $B_3$.

Further, forward gear-hydraulic hybrid transmission is provided between the input mechanism and the output member by adjusting the displacement ratio of the hydraulic transmission mechanism and engaging the clutch $L_1$, the clutch $L_2$, the clutch $L_4$, the clutch $L_5$, the clutch $L_6$, and the clutch $L_7$;

reverse gear-hydraulic hybrid transmission is provided between the input mechanism and the output member by adjusting the displacement ratio of the hydraulic transmission mechanism and engaging the clutch $L_1$, the clutch $L_2$, the clutch $L_4$, the clutch $L_5$, the clutch $L_6$, and the brake $B_3$.

Further, forward double ring-hydraulic hybrid transmission is provided between the input mechanism and the output member by adjusting the displacement ratio of the hydraulic transmission mechanism, adjusting the transmission ratio of the double ring series transmission mechanism, and engaging the clutch $L_2$, the clutch $L_3$, the clutch $L_4$, the clutch $L_5$, the clutch $L_6$, and the clutch $L_7$;

reverse double ring-hydraulic hybrid transmission is provided between the input mechanism and the output member by adjusting the displacement ratio of the hydraulic transmission mechanism, adjusting the transmission ratio of the double ring series transmission mechanism, and engaging the clutch $L_2$, the clutch $L_3$, the clutch $L_4$, the clutch $L_5$, the clutch $L_6$, and the brake $B_3$.

Further, the hydraulic single-flow transmission is configured for being synchronously switched to any one of gear single-flow transmission, double ring single-flow transmission, gear-double ring dual-flow transmission, and gear-hydraulic dual-flow transmission; and the hydraulic single-flow transmission is configured for being switched to the double ring-hydraulic dual-flow transmission at any point.

Further, the double ring single-flow transmission is configured for being synchronously switched to the gear-hydraulic dual-flow transmission, and the double ring single-flow transmission is configured for being switched to the gear-double ring dual-flow transmission at any point; and the gear-double ring dual-flow transmission, the gear-hydraulic dual-flow transmission, and the double ring-hydraulic dual-flow transmission are configured for being synchronously switched to one another.

The present invention has the following beneficial effects:

1. According to the gear-double ring-hydraulic hybrid transmission device of the present invention, the double ring single-flow transmission adopts a front ring transmission mechanism and a rear ring transmission mechanism that are connected in series, which enlarges the transmission ratio adjustment range and improves the adjustment accuracy and the degree of freedom.

2. The gear-double ring-hydraulic hybrid transmission device of the present invention is a multi-mode hybrid transmission device that integrates gear single-flow transmission, double ring single-flow transmission, hydraulic single-flow transmission, gear-double ring hybrid transmission, gear-hydraulic hybrid transmission, and double ring-hydraulic hybrid transmission, and can meet the requirements of different working conditions.

3. The gear-double ring-hydraulic hybrid transmission device of the present invention can realize free switching among different transmission modes.

1. input mechanism; 11. main clutch $L_0$; 12. input shaft; 13. clutch $L_1$; 14. input mechanism gear pair; 15. front shaft; 16. clutch $L_2$; 2. double ring series transmission mechanism; 21. double ring series transmission mechanism gear pair; 22. clutch $L_3$; 23. front ring transmission mechanism; 24. rear ring transmission mechanism; 25. double ring series transmission mechanism output gear pair; 3. jackshaft; 4. hydraulic transmission mechanism; 41. hydraulic transmission mechanism input gear pair; 42. clutch $L_4$; 43. pump shaft; 44. variable displacement pump; 45. quantitative motor; 46. motor shaft; 47. hydraulic transmission mechanism output gear pair; 48. clutch $L_5$; 5. output shaft; 6. front planetary gear mechanism; 61. brake $B_1$; 62. front planetary gear mechanism ring gear; 63. front planetary gear mechanism planet carrier; 64. front planetary gear mechanism sun gear; 7. middle planetary gear mechanism; 71. brake $B_2$; 72. clutch $L_6$; 73. middle planetary gear mechanism ring gear; 74. middle planetary gear mechanism planet carrier; 75. middle planetary gear mechanism sun gear; 8. rear planetary gear mechanism; 81. rear planetary gear mechanism sun gear; 82. rear planetary gear mechanism planet carrier; 83. rear planetary gear mechanism ring gear; 84. brake $B_3$; 85. clutch $L_7$.

DETAILED DESCRIPTION OF THE EMBODIMENTS

The present invention is further described below with reference to the accompanying drawings and specific embodiments, but the protection scope of the present invention is not limited thereto.

Figure 1:
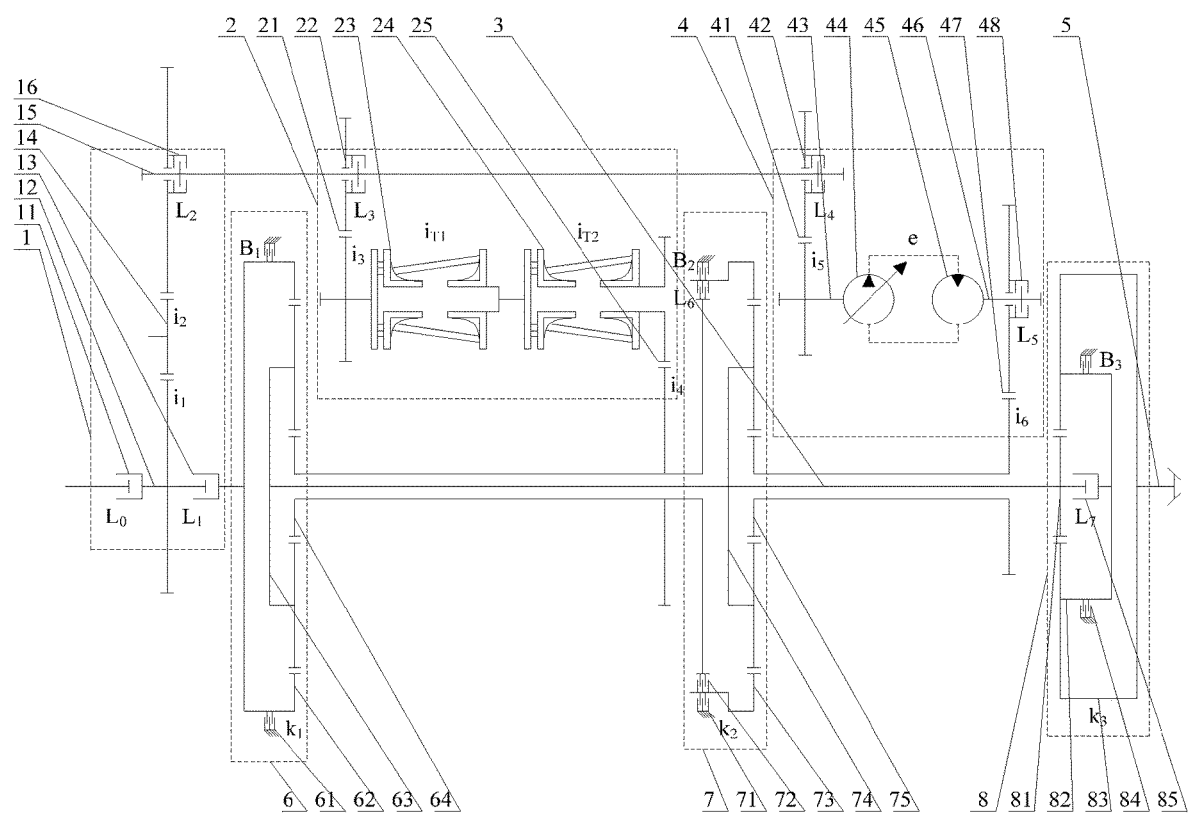
FIG. 1 is a schematic structural diagram of a gear-double ring-hydraulic hybrid transmission device of the present invention.

As shown in FIG. 1, the gear-double ring-hydraulic hybrid transmission device of the present invention includes an input mechanism 1, a double ring series transmission mechanism 2, a hydraulic transmission mechanism 4, an output shaft 5, a front planetary gear mechanism 6, a middle planetary gear mechanism 7, a rear planetary gear mechanism 8, a clutch assembly, and a brake assembly.

The input mechanism 1 includes a main clutch $L_0$ 11, an input shaft 12, a clutch $L_1$ 13, an input mechanism gear pair 14, a front shaft 15, and a clutch $L_2$ 16. A power source is connected to the input shaft 12 through the main clutch $L_0$ 11, the input shaft 12 is connected to a front planetary gear mechanism ring gear 62 through the clutch $L_2$ 16, and the input shaft 12 is connected to the front shaft 15 through the input mechanism gear pair 14. The power source is transmitted through the main clutch $L_0$ 11 to the input shaft 12 and is then split. One branch of the power is transmitted through the clutch $L_1$ 13 to the front planetary gear mechanism ring gear 62, while the other branch of the power is transmitted through the input mechanism gear pair 14 and the clutch $L_2$ 16 to the front shaft 15. The power arriving in the front shaft 15 can be transmitted through a clutch $L_3$ 22 to an input end of the double ring series transmission mechanism 2 and can also be transmitted through a clutch $L_4$ 42 to an input end of the hydraulic transmission mechanism 4.

The double ring series transmission mechanism 2 includes a double ring series transmission mechanism gear pair 21, the clutch $L_3$ 22, a front ring transmission mechanism 23, a rear ring transmission mechanism 24, and a double ring series transmission mechanism output gear pair 25. The front ring transmission mechanism 23 and the rear ring transmission mechanism 24 are connected in series. In the front ring transmission mechanism 23 or the rear ring transmission mechanism 24, when toroidal surfaces move axially, a roller between the two toroidal surfaces slides along the curved surfaces, so that the angle of the transmission shaft varies to realize changes of the transmission ratio. The front shaft 15 is connected to an input of the front ring transmission mechanism 23 through the double ring series transmission mechanism gear pair 21, and an output of the rear ring transmission mechanism 24 is connected to a front planetary gear mechanism sun gear 64 through the double ring series transmission mechanism output gear pair 25. The clutch $L_2$ 16 and the clutch $L_3$ 22 are together used for selectively connecting the input mechanism 1 to the input end of the double ring series transmission mechanism 2 to achieve synchronous rotation.

The hydraulic transmission mechanism 4 includes a hydraulic transmission mechanism input gear pair 41, the clutch $L_4$ 42, a pump shaft 43, a variable displacement pump 44, a quantitative motor 45, a motor shaft 46, a hydraulic transmission mechanism output gear pair 47, and a clutch $L_5$ 48. The front shaft 15 is connected to the pump shaft 43 through the hydraulic transmission mechanism input gear pair 41, the pump shaft 43 drives the variable displacement pump 44 to work, the variable displacement pump 44 forces the motor shaft 46 of the quantitative motor 45 to rotate, and the motor shaft 46 is connected to a middle planetary gear mechanism sun gear 75 through the hydraulic transmission mechanism output gear pair 47. The clutch $L_2$ 16 and the clutch $L_4$ 42 are together used for selectively connecting the input mechanism 1 to the input end of the hydraulic transmission mechanism 4 to achieve synchronous rotation. The clutch $L_5$ 48 is used for selectively connecting an output end of the hydraulic transmission mechanism 4 to the sun gear of the middle planetary gear mechanism 7 to achieve synchronous rotation.

The jackshaft 3 is fixedly connected to a front planetary gear mechanism planet carrier 63, a middle planetary gear mechanism planet carrier 74, and a rear planetary gear mechanism sun gear 81. The front planetary gear mechanism 6 includes a brake $B_1$ 61, the front planetary gear mechanism ring gear 62, the front planetary gear mechanism planet carrier 63, and the front planetary gear mechanism sun gear 64. The front planetary gear mechanism ring gear 62 is connected to the input shaft 12 through the clutch $L_1$ 13 and is connected to a fixed member through the brake $B_1$ 61. The front planetary gear mechanism sun gear 64 is connected to an output end of the double ring series transmission mechanism 2 and can also be connected to a middle planetary gear mechanism ring gear 73 through a clutch $L_6$ 72. The middle planetary gear mechanism 7 includes a brake $B_2$ 71, the clutch $L_6$ 72, the middle planetary gear mechanism ring gear 73, the middle planetary gear mechanism planet carrier 74, and the middle planetary gear mechanism sun gear 75. The middle planetary gear mechanism ring gear 73 can be connected to the front planetary gear mechanism sun gear 64 through the clutch $L_6$ 72 and can also be connected to a fixed member through the brake $B_2$ 71. The middle planetary gear mechanism sun gear 75 is connected to the output end of the hydraulic transmission mechanism 4. The rear planetary gear mechanism 8 includes the rear planetary gear mechanism sun gear 81, a rear planetary gear mechanism planet carrier 82, a rear planetary gear mechanism ring gear 83, a brake $B_3$ 84, and a clutch $L_7$ 85. The rear planetary gear mechanism planet carrier 82 can be connected to the rear planetary gear mechanism sun gear 81 through the clutch $L_7$ 85 and can also be connected to a fixed member through the brake $B_3$ 84. The rear planetary gear mechanism ring gear 83 is connected to the output shaft 5.

Figure 2:
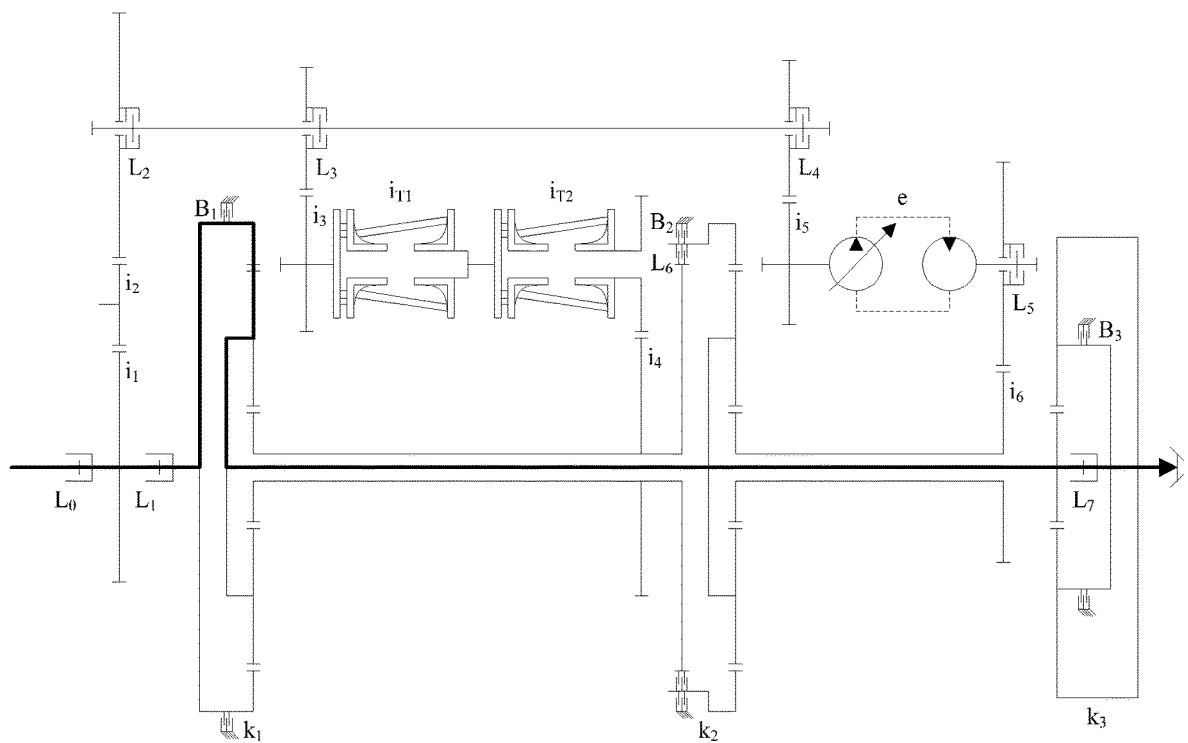
FIG. 2 is a schematic diagram showing the power flow in forward gear single-flow transmission according to the present invention.
Figure 8:
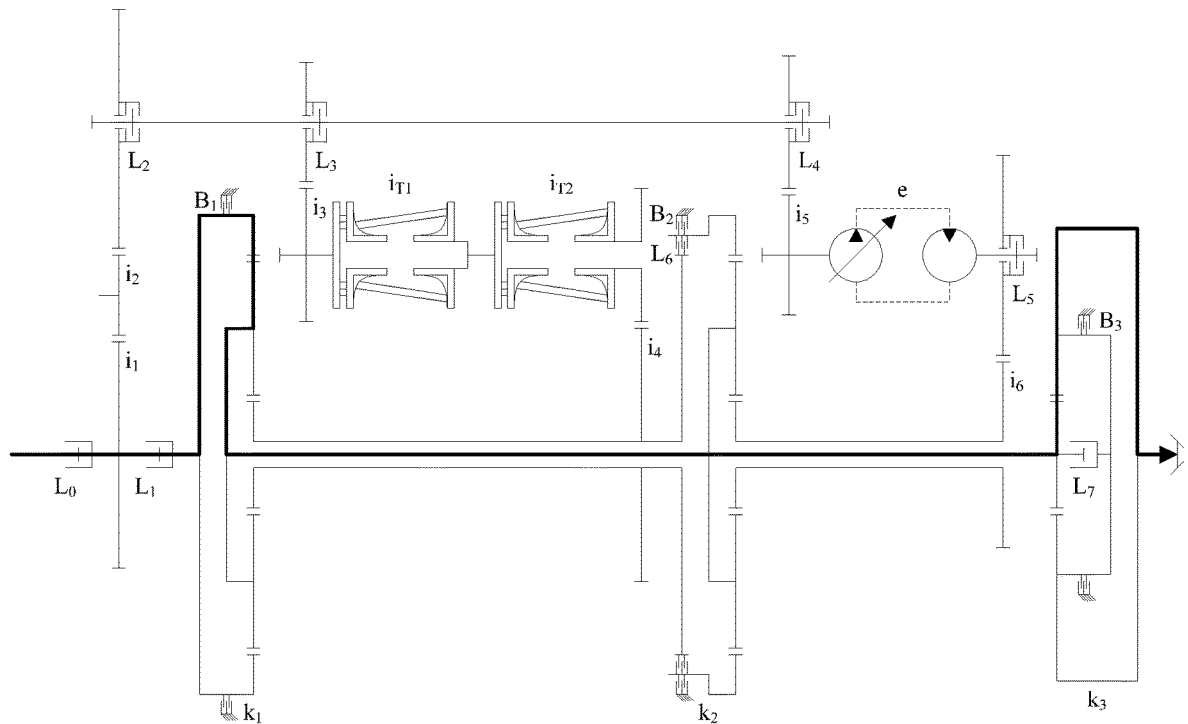
FIG. 8 is a schematic diagram showing the power flow in reverse gear single-flow transmission according to the present invention.

Transmission modes including gear single-flow transmission, double ring single-flow transmission, hydraulic single-flow transmission, gear-double ring hybrid transmission, gear-hydraulic hybrid transmission, and double ring-hydraulic hybrid transmission are provided between the input mechanism and the output member by adjusting a transmission ratio of the double ring series transmission mechanism 2 and a displacement ratio of the hydraulic transmission mechanism 4 and selectively controlling engagement of the clutch assembly and the brake assembly. Specific examples are given below for illustration with reference to Table 1:

As shown in FIG. 2 and FIG. 8, the gear single-flow transmission includes forward and reverse gear single-flow transmission.

The forward gear single-flow transmission is shown in FIG. 2, wherein when the main clutch $L_0$ 11, the clutch $L_1$ 13, the clutch $L_6$ 72, the clutch $L_7$ 85, and the brake $B_2$ 71 are engaged, power is transmitted through the main clutch $L_0$ 11, the input shaft 12, the clutch $L_1$ 13, the front planetary gear mechanism ring gear 62, and the front planetary gear mechanism planet carrier 63 to the jackshaft 3, then passes through the rear planetary gear mechanism 8 that is fixedly connected as a whole, and is output from the output shaft 5. In this case, the rotation speeds of the output shaft and the input shaft are in the following relationship:

$$n_o = \frac{k_1}{k_1 + 1} n_I$$

wherein $n_o$ is the rotation speed of the output shaft 5, $n_I$ is the rotation speed of the input shaft 12, and $k_1$ is a characteristic parameter of the front planetary gear mechanism.

The reverse gear single-flow transmission is shown in FIG. 8, wherein when the main clutch $L_0$ 11, the clutch $L_1$ 13, the clutch $L_6$ 72, the brake $B_2$ 71, and the brake $B_3$ 84 are engaged, power is transmitted through the main clutch $L_0$ 11, the input shaft 12, the clutch $L_1$ 13, the front planetary gear mechanism ring gear 62, and the front planetary gear mechanism planet carrier 63 to the jackshaft 3, then passes through the rear planetary gear mechanism sun gear 81 and the rear planetary gear mechanism ring gear 83, and is output from the output shaft 5. In this case, the rotation speeds of the output shaft and the input shaft are in the following relationship:

$$n_o = \frac{k_1}{(k_1 + 1)k_3} n_I$$

wherein $k_3$ is a characteristic parameter of the rear planetary gear mechanism.

Figure 3:
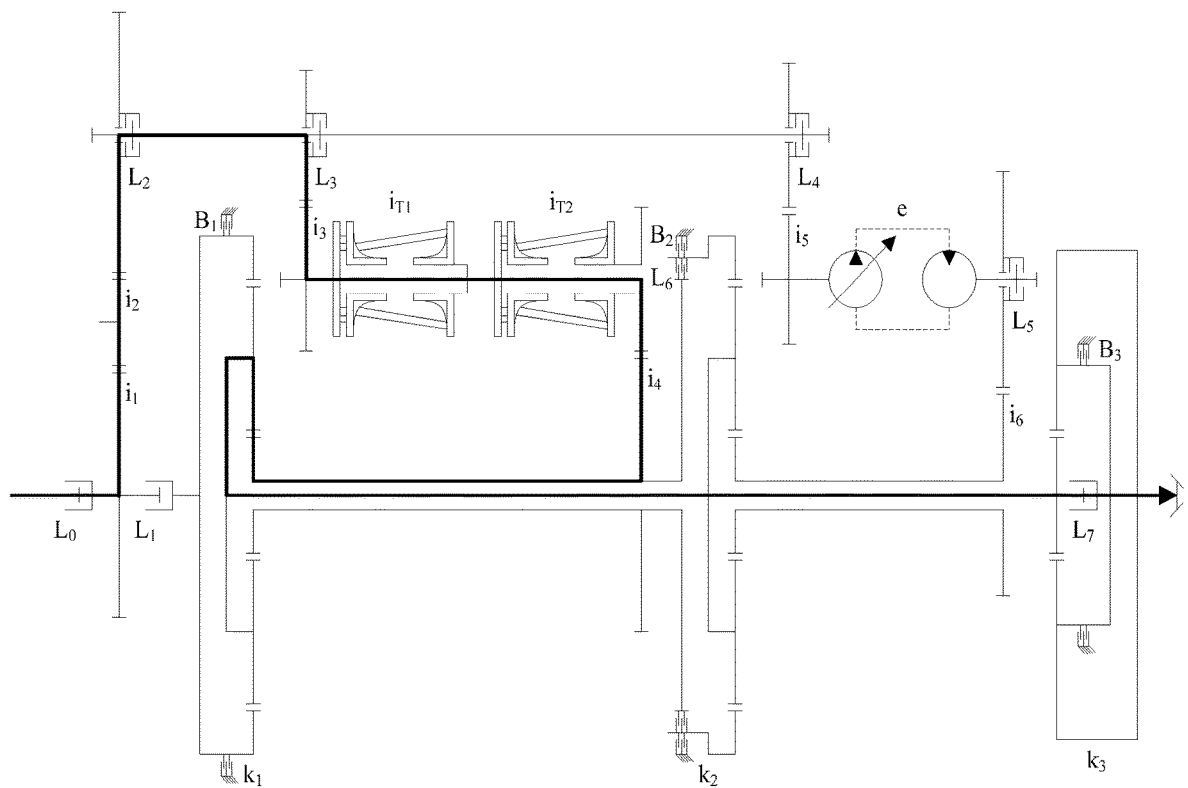
FIG. 3 is a schematic diagram showing the power flow in forward double ring single-flow transmission according to the present invention.
Figure 9:
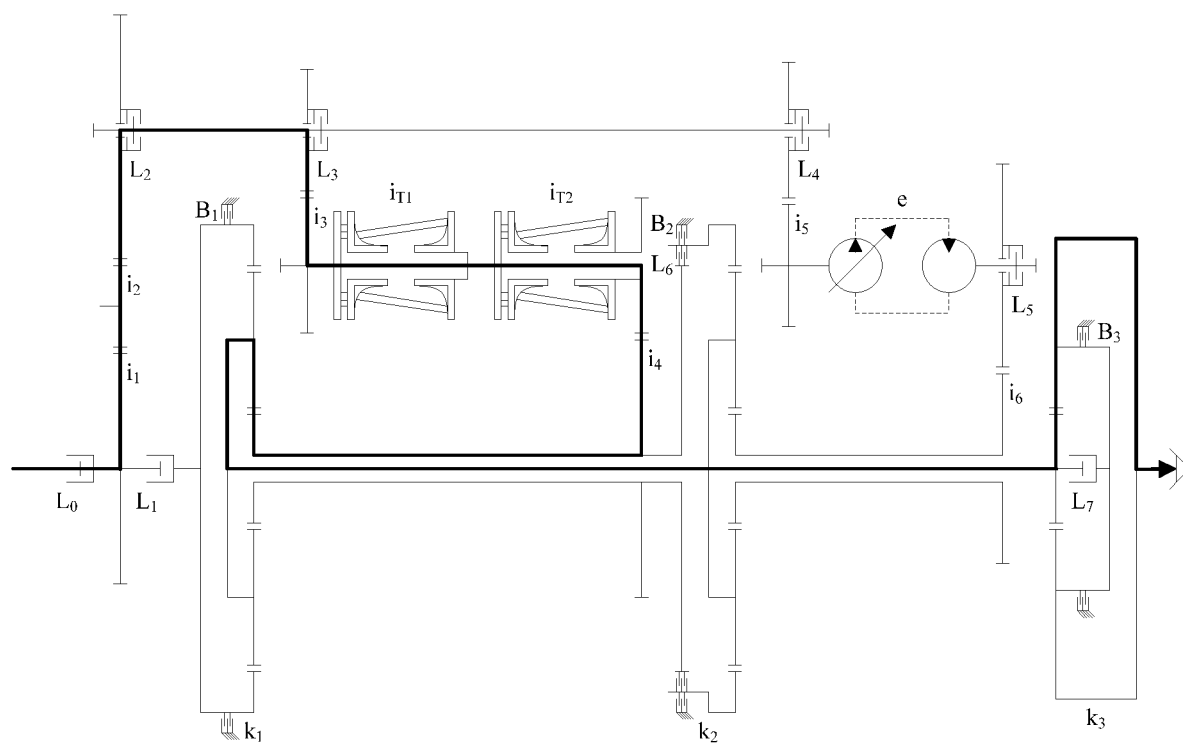
FIG. 9 is a schematic diagram showing the power flow in reverse double ring single-flow transmission according to the present invention.

As shown in FIG. 3 and FIG. 9, the double ring single-flow transmission includes forward and reverse double ring single-flow transmission.

The forward double ring single-flow transmission is shown in FIG. 3, wherein when the main clutch $L_0$ 11, the clutch $L_2$ 16, the clutch $L_3$ 22, the clutch $L_7$ 85, and the brake $B_1$ 61 are engaged, power is transmitted through the input mechanism 1, the double ring series transmission mechanism 2, the front planetary gear mechanism sun gear 64, and the front planetary gear mechanism planet carrier 63 to the jackshaft 3, then passes through the rear planetary gear mechanism 8 that is fixedly connected as a whole, and is output from the output shaft 5. In this case, the rotation speeds of the output shaft and the input shaft are in the following relationship:

$$n_o = \frac{1}{i_1 i_2 i_3 i_4 i_{T1} i_{T2}(k_1 + 1)} n_I$$

wherein $i_1 i_2$ is a transmission ratio between the input shaft 12 and the front shaft 15, $i_3$ is a transmission ratio of the double ring series transmission mechanism gear pair 21, $i_4$ is a transmission ratio of the double ring series transmission mechanism output gear pair 25, $i_{T1}$ is a transmission ratio of the front ring transmission mechanism 23, $i_{T1} \in [0.5, 2.0]$; $i_{T2}$ is a transmission ratio of the rear ring transmission mechanism, $i_{T2} \in [0.5, 2.0]$. Then, $i_4 i_{T1} i_{T2} \in [0.25, 4.00]$.

The reverse double ring single-flow transmission is shown in FIG. 9, wherein when the main clutch $L_0$ 11, the clutch $L_2$ 16, the clutch $L_3$ 22, the brake $B_1$ 61, and the brake $B_3$ 84 are engaged, power is transmitted through the input mechanism 1, the double ring series transmission mechanism 2, the front planetary gear mechanism sun gear 64, and the front planetary gear mechanism planet carrier 63 to the jackshaft 3, then passes through the rear planetary gear mechanism sun gear 81 and the rear planetary gear mechanism ring gear 83, and is output from the output shaft 5. In this case, the rotation speeds of the output shaft and the input shaft are in the following relationship:

$$n_o = \frac{1}{i_1 i_2 i_3 i_4 i_{T1} i_{T2}(k_1 + 1)k_3} n_I.$$

Figure 4:
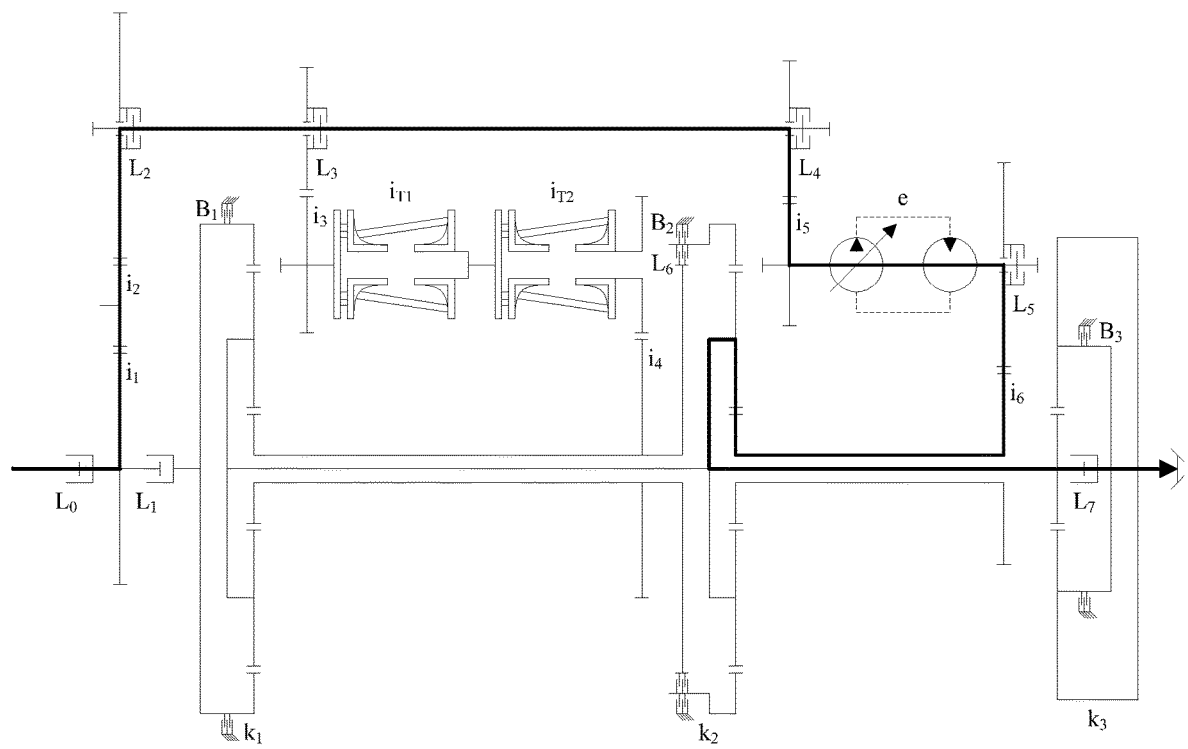
FIG. 4 is a schematic diagram showing the power flow in forward hydraulic single-flow transmission according to the present invention.
Figure 10:
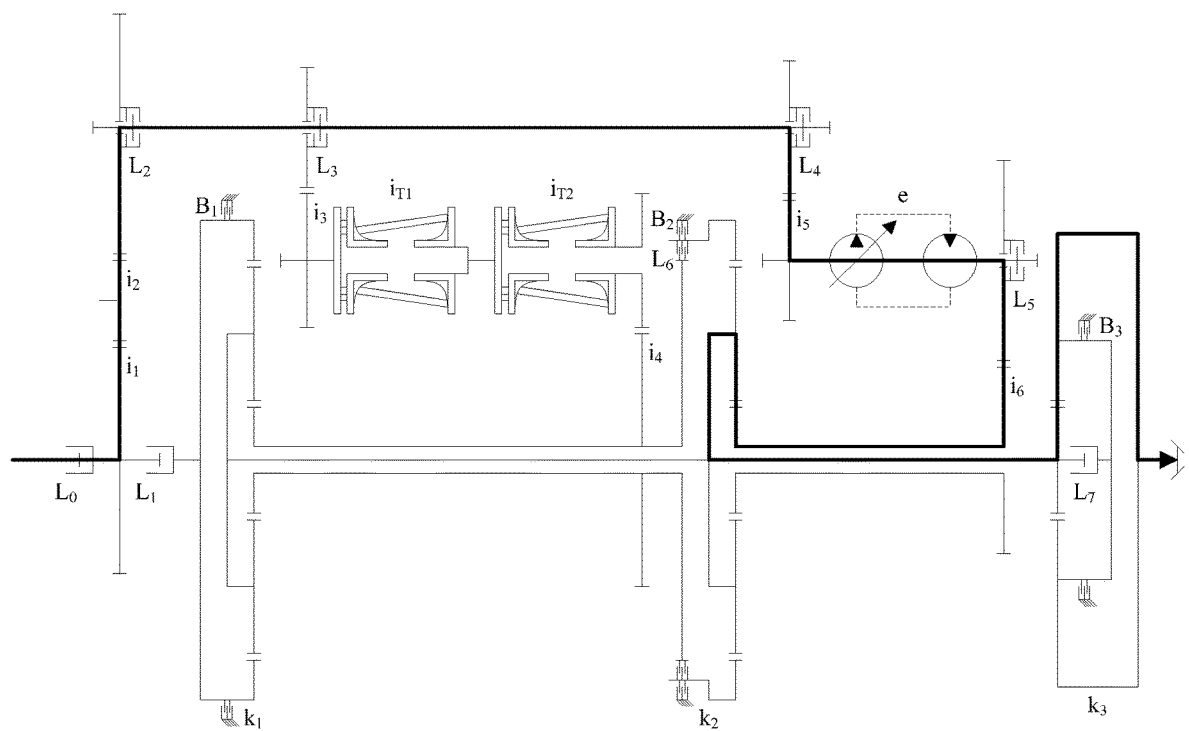
FIG. 10 is a schematic diagram showing the power flow in reverse hydraulic single-flow transmission according to the present invention.

As shown in FIG. 4 and FIG. 10, the hydraulic single-flow transmission includes forward and reverse hydraulic single-flow transmission.

The forward hydraulic single-flow transmission is shown in FIG. 4, wherein when the main clutch $L_4$ 11, the clutch $L_2$ 16, the clutch $L_4$ 42, the clutch $L_1$ 48, the clutch $L_6$ 72, the clutch $L_7$ 85, and the brake $B_2$ 71 are engaged, power is transmitted through the input mechanism 1, the hydraulic transmission mechanism 4, the middle planetary gear mechanism sun gear 75, and the middle planetary gear mechanism planet carrier 74 to the jackshaft 3, then passes through the rear planetary gear mechanism 8 that is fixedly connected as a whole, and is output from the output shaft 5. In this case, the rotation speeds of the output shaft and the input shaft are in the following relationship:

$$n_o = \frac{e}{i_1 i_2 i_5 i_6 (k_2 + 1)} n_I.$$

wherein $i_5$ is a transmission ratio of the hydraulic transmission mechanism input gear pair 41, $i_6$ is a transmission ratio of the hydraulic transmission mechanism output gear pair 47, $k_2$ is a characteristic parameter of the middle planetary gear mechanism, and e is a displacement ratio of the hydraulic transmission mechanism, $e \in [0, 1.0]$.

The reverse hydraulic single-flow transmission is shown in FIG. 10, wherein when the main clutch $L_0$ 11, the clutch $L_2$ 16, the clutch $L_4$ 42, the clutch $L_5$ 48, the clutch $L_6$ 72, the brake $B_2$ 71, and the brake $B_3$ 84 are engaged, power is transmitted through the input mechanism 1, the hydraulic transmission mechanism 4, the middle planetary gear mechanism sun gear 75, and the middle planetary gear mechanism planet carrier 74 to the jackshaft 3, then passes through the rear planetary gear mechanism sun gear 81 and the rear planetary gear mechanism ring gear 83, and is output from the output shaft 5. In this case, the rotation speeds of the output shaft and the input shaft are in the following relationship:

$$n_o = \frac{e}{i_1 i_2 i_5 i_6 (k_2 + 1) k_3} n_I.$$

Figure 5:
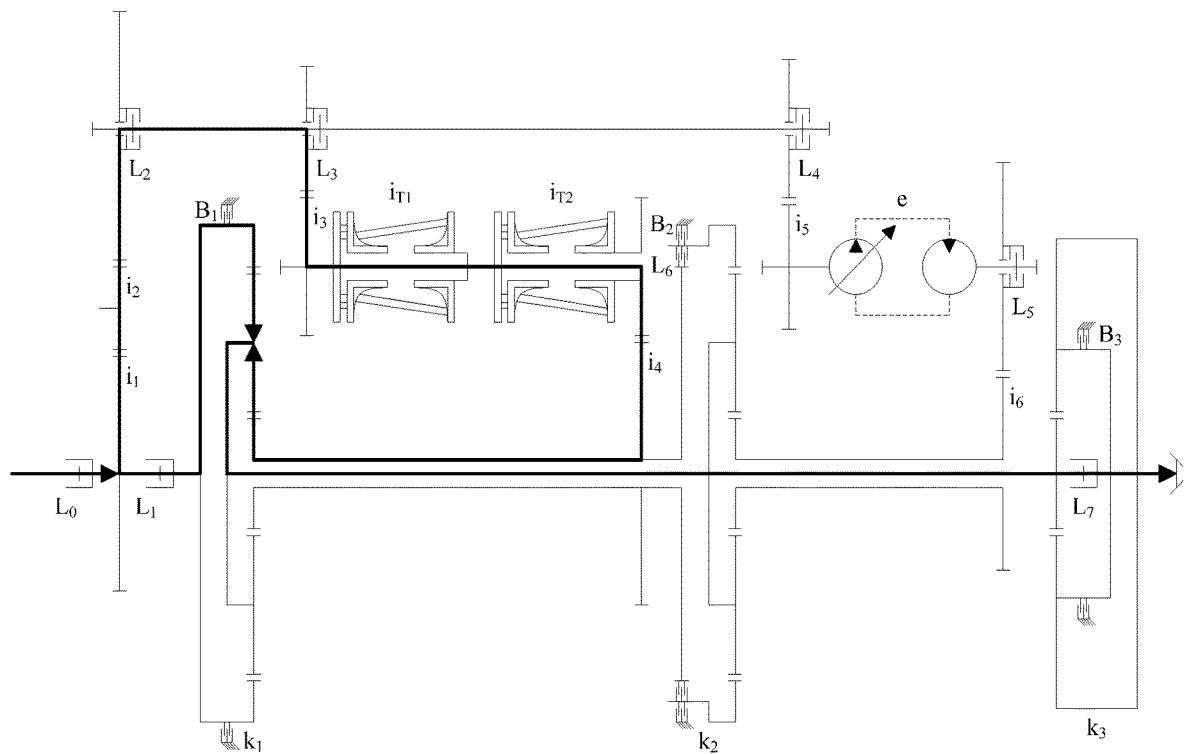
FIG. 5 is a schematic diagram showing the power flow in forward gear-double ring hybrid transmission according to the present invention.
Figure 11:
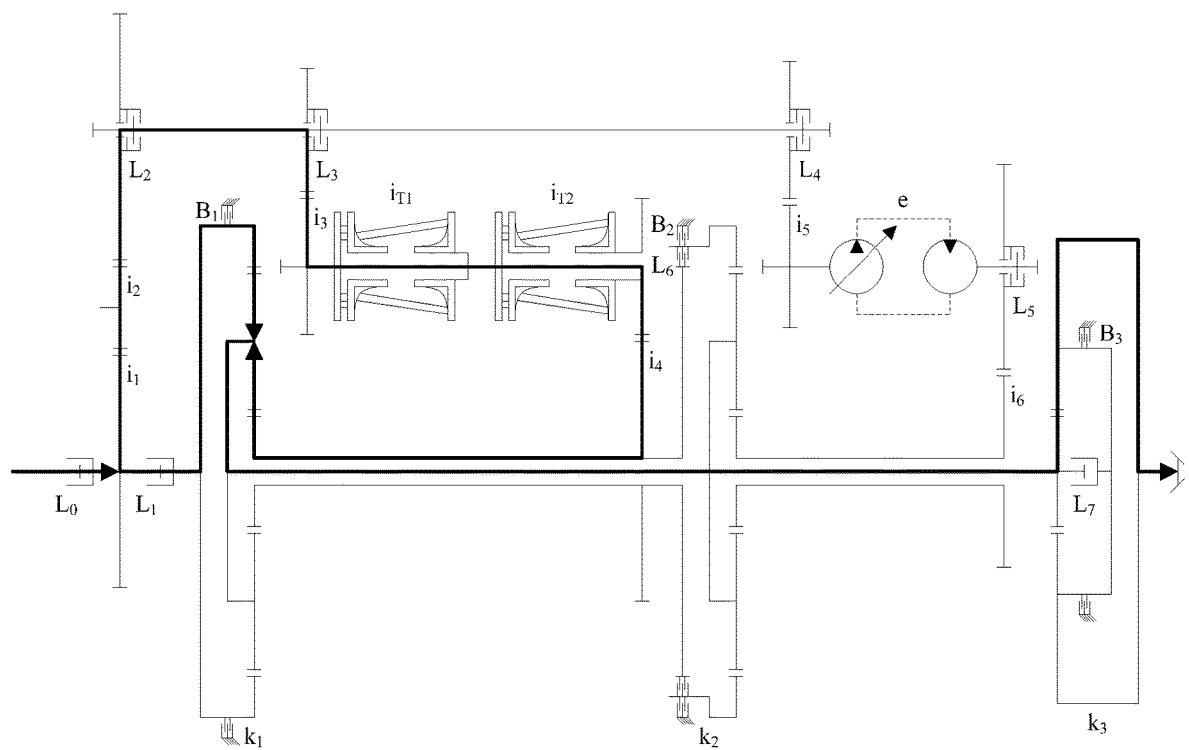
FIG. 11 is a schematic diagram showing the power flow in reverse gear-double ring hybrid transmission according to the present invention.

As shown in FIG. 5 and FIG. 11, the gear-double ring hybrid transmission includes forward and reverse gear-double ring hybrid transmission.

The forward gear-double ring hybrid transmission is shown in FIG. 5, wherein when the main clutch $L_0$ 11, the clutch $L_1$ 13, the clutch $L_2$ 16, the clutch $L_3$ 22, and the clutch $L_7$ 85 are engaged, power passes through the main clutch $L_0$ 11 and the input shaft 12 and is then split. One branch of the power is transmitted through the input mechanism gear pair 14, the clutch $L_2$ 16, the front shaft 15, and the double ring series transmission mechanism 2 to the front planetary gear mechanism sun gear 64, while the other branch of the power is directly transmitted through the clutch $L_1$ 13 to the front planetary gear mechanism ring gear 62. The hybrid power is transmitted through the front planetary gear mechanism planet carrier 63 to the jackshaft 3, then passes through the rear planetary gear mechanism 8 that is fixedly connected as a whole, and is output from the output shaft 5. In this case, the rotation speeds of the output shaft and the input shaft are in the following relationship:

$$n_o = \frac{\frac{1}{i_1 i_2 i_3 i_4 i_{T1} i_{T2}} + k_1}{k_1 + 1} n_I.$$

The reverse gear-double ring hybrid transmission is shown in FIG. 11, wherein when the main clutch $L_0$ 11, the clutch $L_1$ 13, the clutch $L_2$ 16, the clutch $L_3$ 22, and the brake $B_3$ 84 are engaged, power passes through the main clutch $L_0$ 11 and the input shaft 12 and is then split. One branch of the power is transmitted through the input mechanism gear pair 14, the clutch $L_2$ 16, the front shaft 15, and the double ring series transmission mechanism 2 to the front planetary gear mechanism sun gear 64, while the other branch of the power is directly transmitted through the clutch $L_1$ 13 to the front planetary gear mechanism ring gear 62. The hybrid power is transmitted through the front planetary gear mechanism planet carrier 63 to the jackshaft 3, then passes through the rear planetary gear mechanism sun gear 81 and the rear planetary gear mechanism ring gear 83, and is output from the output shaft 5. In this case, the rotation speeds of the output shaft and the input shaft are in the following relationship:

$$n_o = \frac{\frac{1}{i_1 i_2 i_3 i_4 i_{T1} i_{T2}} + k_1}{(k_1 + 1) k_3} n_I.$$

Figure 6:
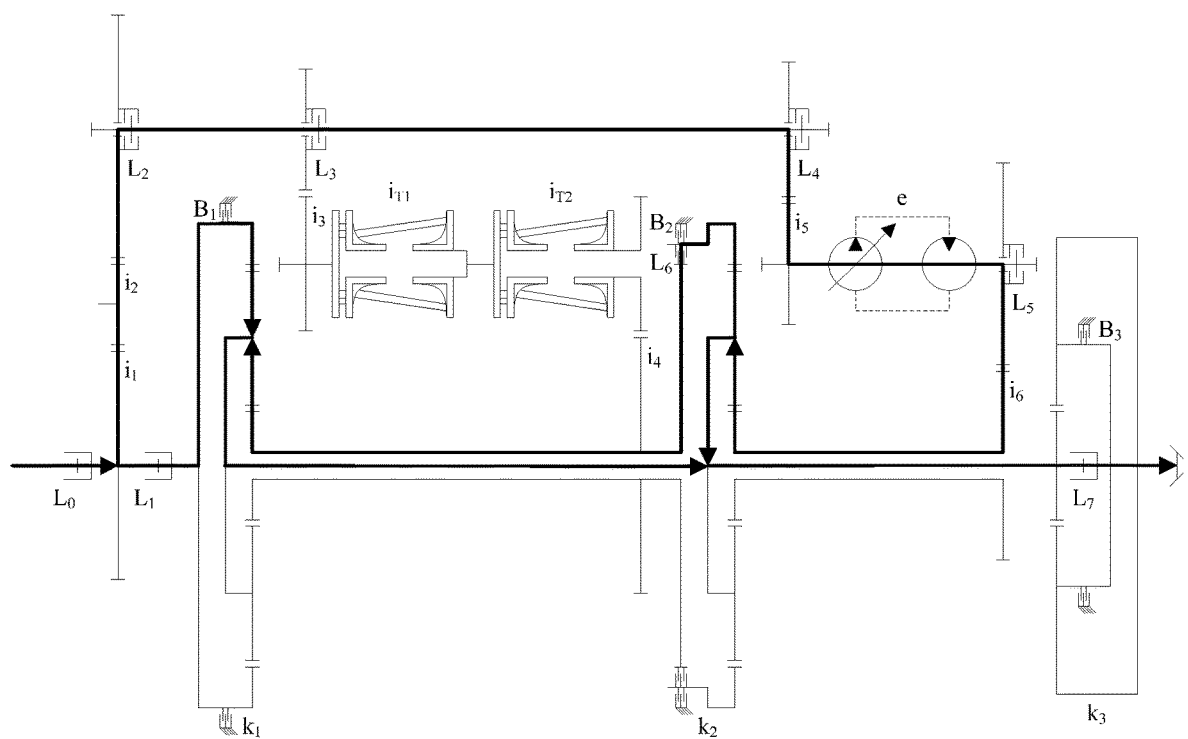
FIG. 6 is a schematic diagram showing the power flow in forward gear-hydraulic hybrid transmission according to the present invention.
Figure 12:
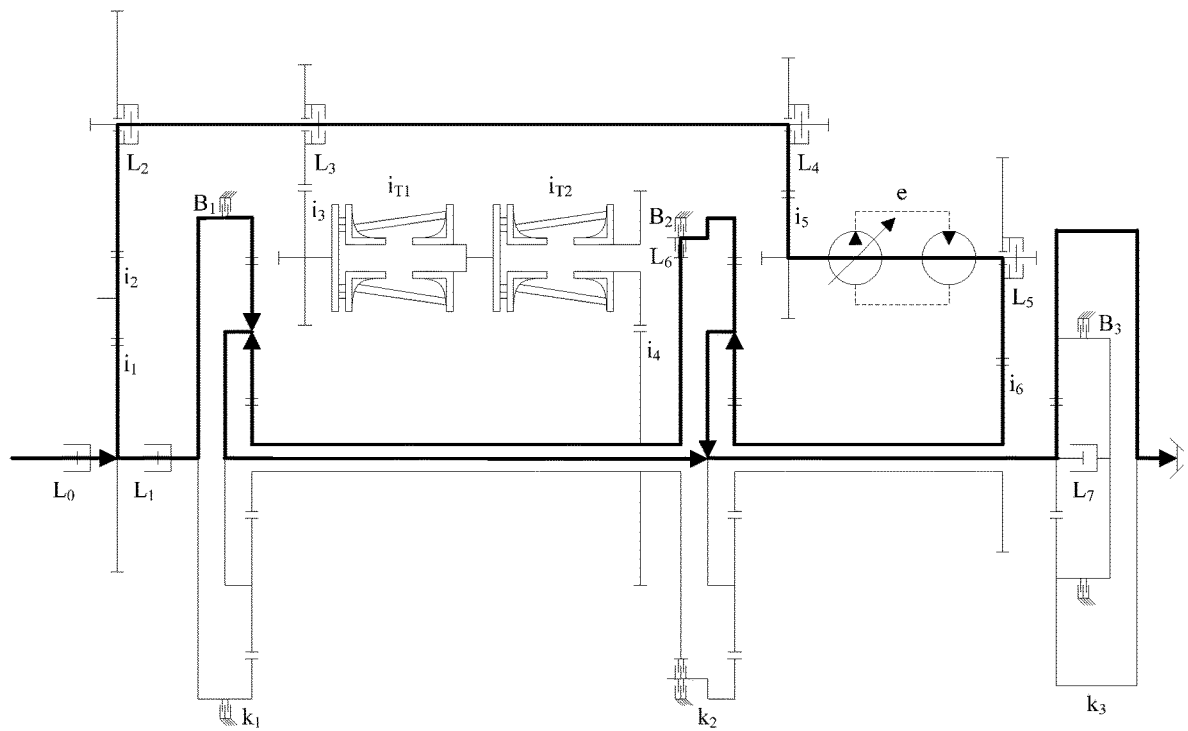
FIG. 12 is a schematic diagram showing the power flow in reverse gear-hydraulic hybrid transmission according to the present invention.

As shown in FIG. 6 and FIG. 12, the gear-hydraulic hybrid transmission includes forward and reverse gear-hydraulic hybrid transmission.

The forward gear-hydraulic hybrid transmission is shown in FIG. 6, wherein when the main clutch $L_0$ 11, the clutch $L_1$ 13, the clutch $L_2$ 16, the clutch $L_4$ 42, the clutch $L_5$ 48, the clutch $L_6$ 72, and the clutch $L_7$ 85 are engaged, the front planetary gear mechanism sun gear 64 is connected to the middle planetary gear mechanism ring gear 73, the front planetary gear mechanism planet carrier 63 is connected to the middle planetary gear mechanism planet carrier 74, and power passes through the main clutch $L_0$ 11 and the input shaft 12 and is then split. One branch of the power is directly transmitted through the clutch $L_1$ 13 to the front planetary gear mechanism ring gear 62, while the other branch of the power is transmitted through the input mechanism gear pair 14, the clutch $L_2$ 16, the front shaft 15, and the hydraulic transmission mechanism 4 to the middle planetary gear mechanism sun gear 75. Then, the power is split again. A first sub-branch of the power is transmitted to the middle planetary gear mechanism planet carrier 74, while a second sub-branch of the power is transmitted through the middle planetary gear mechanism ring gear 73 to the front planetary gear mechanism sun gear 64. The mechanical power flow transmitted to the front planetary gear mechanism ring gear 62 and the hydraulic power flow transmitted to the front planetary gear mechanism sun gear 64 are converged at the front planetary gear mechanism planet carrier 63, and are further converged with the hydraulic power flow transmitted to the middle planetary gear mechanism planet carrier 74. After that, the power is transmitted to the jackshaft 3, then passes through the rear planetary gear mechanism 8 that is fixedly connected as a whole, and is output from the output shaft 5. In this case, the rotation speeds of the output shaft and the input shaft are in the following relationship:

$$n_o = \frac{k_1 k_2 - \frac{e}{i_1 i_2 i_5 i_6}}{k_1 k_2 - 1} n_I.$$

The reverse gear-hydraulic hybrid transmission is shown in FIG. 12, wherein when the main clutch $L_0$ 11, the clutch $L_1$ 13, the clutch $L_2$ 16, the clutch $L_4$ 42, the clutch $L_5$ 48, the clutch $L_6$ 72, and the brake $B_3$ 84 are engaged, the front planetary gear mechanism sun gear 64 is connected to the middle planetary gear mechanism ring gear 73, the front planetary gear mechanism planet carrier 63 is connected to the middle planetary gear mechanism planet carrier 74, and power passes through the main clutch $L_0$ 11 and the input shaft 12 and is then split. One branch of the power is directly transmitted through the clutch $L_1$ 13 to the front planetary gear mechanism ring gear 62, while the other branch of the power is transmitted through the input mechanism gear pair 14, the clutch $L_2$ 16, the front shaft 15, and the hydraulic transmission mechanism 4 to the middle planetary gear mechanism sun gear 75. Then, the power is split again. A first sub-branch of the power is transmitted to the middle planetary gear mechanism planet carrier 74, while a second sub-branch of the power is transmitted through the middle planetary gear mechanism ring gear 73 to the front planetary gear mechanism sun gear 64. The mechanical power flow transmitted to the front planetary gear mechanism ring gear 62 and the hydraulic power flow transmitted to the front planetary gear mechanism sun gear 64 are converged at the front planetary gear mechanism planet carrier 63, and are further converged with the hydraulic power flow transmitted to the middle planetary gear mechanism planet carrier 74. After that, the power is transmitted to the jackshaft 3, then passes through the rear planetary gear mechanism sun gear 81 and the rear planetary gear mechanism ring gear 83, and is output from the output shaft 5. In this case, the rotation speeds of the output shaft and the input shaft are in the following relationship:

$$n_o = -\frac{k_1 k_2 - \frac{e}{i_1 i_2 i_5 i_6}}{k_3 (k_1 k_2 - 1)} n_I.$$

Figure 7:
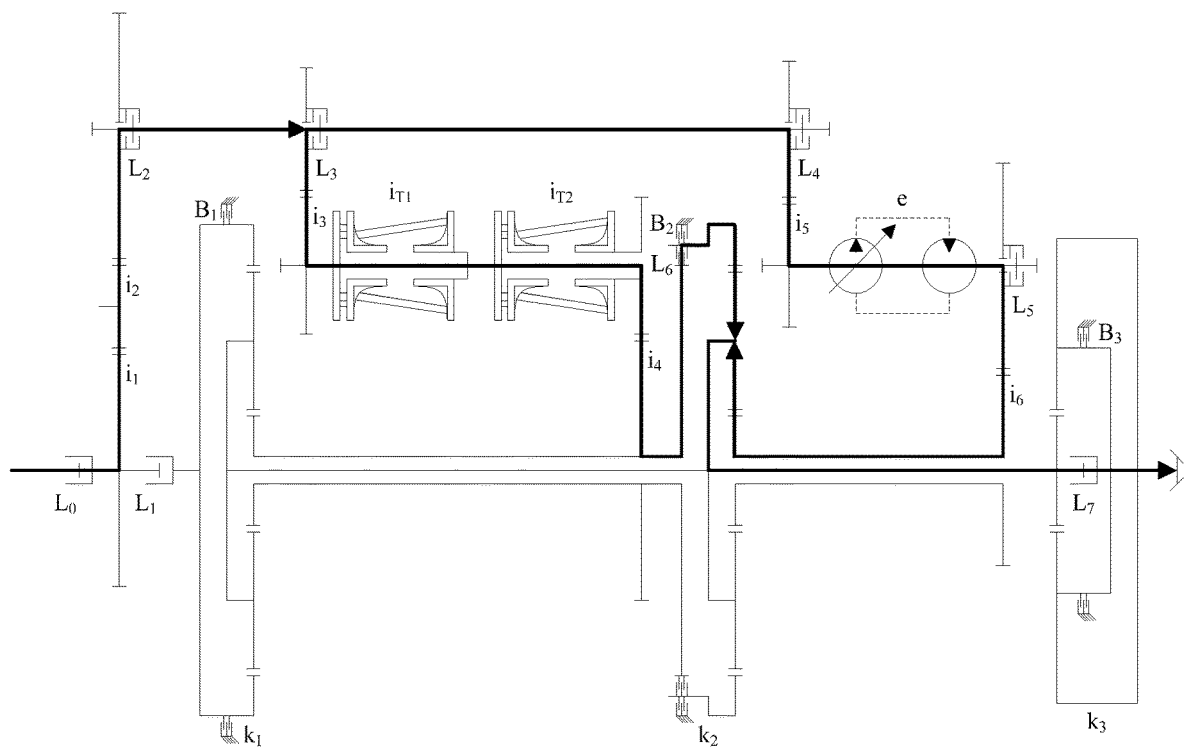
FIG. 7 is a schematic diagram showing the power flow in forward double ring-hydraulic hybrid transmission according to the present invention.
Figure 13:
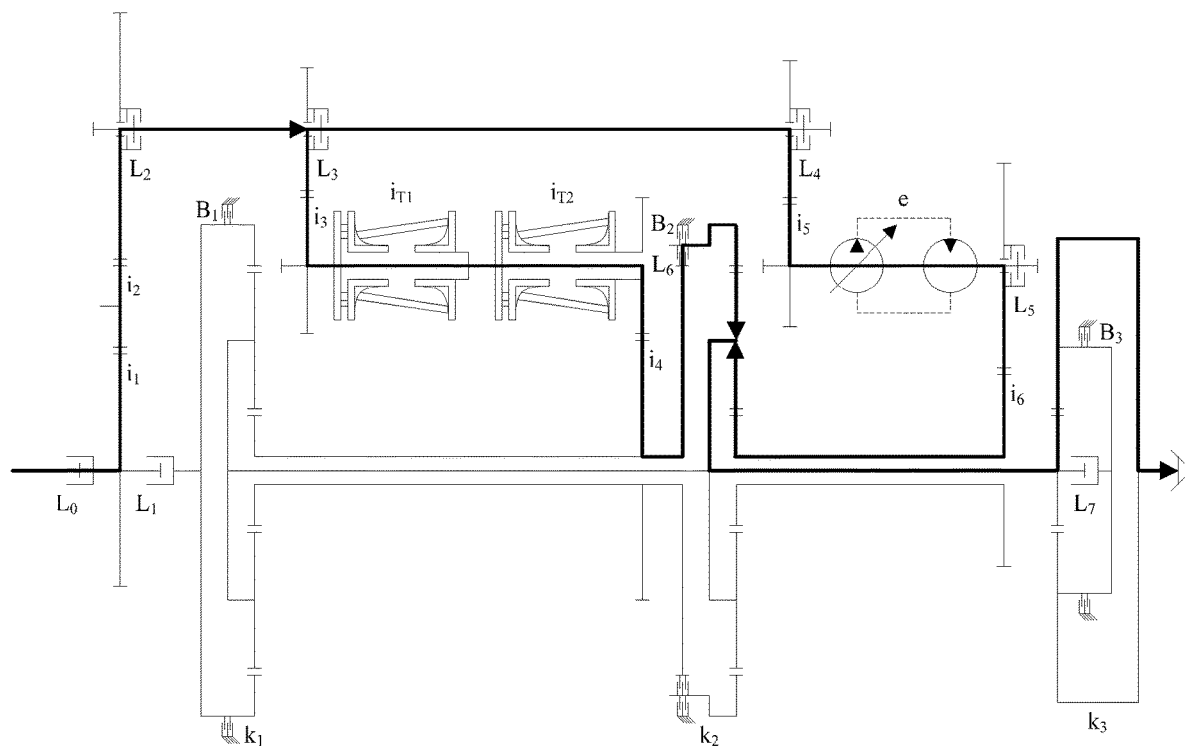
FIG. 13 is a schematic diagram showing the power flow in reverse double ring-hydraulic hybrid transmission according to the present invention.

As shown in FIG. 7 and FIG. 13, the double ring-hydraulic hybrid transmission includes forward and reverse double ring-hydraulic hybrid transmission.

The forward double ring-hydraulic hybrid transmission is shown in FIG. 7, wherein when the main clutch $L_0$ 11, the clutch $L_2$ 16, the clutch $L_3$ 22, the clutch $L_4$ 42, the clutch $L_5$ 48, the clutch $L_6$ 72, and the clutch $L_7$ 85 are engaged, power passes through the input mechanism 1 and is then split. One branch of the power is transmitted through the double ring series transmission mechanism 2 to the middle planetary gear mechanism ring gear 73, while the other branch of the power is transmitted through the hydraulic transmission mechanism 4 to the middle planetary gear mechanism sun gear 75. The hybrid power is transmitted through the middle planetary gear mechanism planet carrier 74 to the jackshaft 3, then passes through the rear planetary gear mechanism 8 that is fixedly connected as a whole, and is output from the output shaft 5. In this case, the rotation speeds of the output shaft and the input shaft are in the following relationship:

$$n_o = -\frac{\frac{e}{i_1 i_2 i_5 i_6} + \frac{k_2}{i_1 i_2 i_3 i_4 i_{T1} i_{T2}}}{k_2 + 1} n_I.$$

The reverse double ring-hydraulic hybrid transmission is shown in FIG. 13, wherein when the main clutch $L_0$ 11, the clutch $L_2$ 16, the clutch $L_3$ 22, the clutch $L_4$ 42, the clutch $L_5$ 48, the clutch $L_6$ 72, and the brake $B_3$ 84 are engaged, power passes through the input mechanism 1 and is then split. One branch of the power is transmitted through the double ring series transmission mechanism 2 to the middle planetary gear mechanism ring gear 73, while the other branch of the power is transmitted through the hydraulic transmission mechanism 4 to the middle planetary gear mechanism sun gear 75. The hybrid power is transmitted through the middle planetary gear mechanism planet carrier 74 to the jackshaft 3, then passes through the rear planetary gear mechanism sun gear 81 and the rear planetary gear mechanism ring gear 83, and is output from the output shaft 5. In this case, the rotation speeds of the output shaft and the input shaft are in the following relationship:

$$n_o = -\frac{\frac{e}{i_1 i_2 i_5 i_6} + \frac{k_2}{i_1 i_2 i_3 i_4 i_{T1} i_{T2}}}{(k_2 + 1) k_3} n_I.$$

TABLE 1

Engagement/disengagement of each component

| Transmission type | Direction | \multicolumn{11}{c}{Execution component} |
| --- | --- | --- | --- | --- | --- | --- | --- | --- | --- | --- | --- | --- |
| | | $L_0$ | $L_1$ | $L_2$ | $L_3$ | $L_4$ | $L_5$ | $L_6$ | $L_7$ | $B_1$ | $B_2$ | $B_3$ |
| Gear single-flow | Forward | ▲ | ▲ | Δ | Δ | Δ | Δ | ▲ | ▲ | Δ | ▲ | Δ |
| Double ring single-flow | | ▲ | Δ | ▲ | ▲ | Δ | Δ | Δ | ▲ | ▲ | Δ | Δ |
| Hydraulic single-flow | | ▲ | Δ | ▲ | Δ | ▲ | ▲ | ▲ | ▲ | Δ | ▲ | Δ |
| Gear-double ring hybrid | | ▲ | ▲ | ▲ | ▲ | Δ | Δ | Δ | ▲ | Δ | Δ | Δ |
| Gear-hydraulic hybrid | | ▲ | ▲ | ▲ | Δ | ▲ | ▲ | ▲ | ▲ | Δ | Δ | Δ |
| Double ring-hydraulic hybrid | | ▲ | Δ | ▲ | ▲ | ▲ | ▲ | ▲ | ▲ | Δ | Δ | Δ |
| Gear single-flow | Reverse | ▲ | ▲ | Δ | Δ | Δ | Δ | ▲ | Δ | Δ | ▲ | ▲ |
| Double ring single-flow | | ▲ | Δ | ▲ | ▲ | Δ | Δ | Δ | Δ | ▲ | Δ | ▲ |
| Hydraulic single-flow | | ▲ | Δ | ▲ | Δ | ▲ | ▲ | ▲ | Δ | Δ | ▲ | ▲ |
| Gear-double ring hybrid | | ▲ | ▲ | ▲ | ▲ | Δ | Δ | Δ | Δ | Δ | Δ | ▲ |
| Gear-hydraulic hybrid | | ▲ | ▲ | ▲ | Δ | ▲ | ▲ | ▲ | Δ | Δ | Δ | ▲ |
| Double ring-hydraulic hybrid | | ▲ | Δ | ▲ | ▲ | ▲ | ▲ | Δ | Δ | Δ | Δ | ▲ |

In Table 1: 1. B stands for brake, and L stands for clutch;

2. ♦ stands for engagement of a gear-shift component, and Δ stands for disengagement of a gear-shift component.

In an embodiment, the following parameters are selected: $k_1 = k_2 = k_3 = 1.5$, $i_1 i_2 i_3 i_4 = 1.0$, $i_1 i_2 i_5 i_6 = 0.5$, $i_{T1} \in [0.5, 2.0]$, and $i_T = i_{T1} i_{T2} \in [0.25, 4.00]$.

In this case, the relational expressions of the rotation speeds of the output shaft and the input shaft and the speed regulation ranges thereof are shown in Table 2.

TABLE 2

Relational expressions of the rotation speeds of the output shaft and the input shaft and speed regulation ranges thereof

| Transmission type | Relational expressions of the rotation speeds of the output shaft and the input shaft | | Speed regulation range |
| --- | --- | --- | --- |
| Gear single-flow (forward) | $n_o = \frac{k_1}{k_1 + 1} n_I$ | $n_o = 0.6 n_I$ | $n_o = 0.6 n_I$ |
| Double ring single-flow (forward) | $n_o = \frac{1}{i_1 i_2 i_3 i_4 i_{T1} i_{T2} (k_1 + 1)} n_I$ | $n_o = \frac{0.4}{i_T} n_I$ | $n_o \in [0.1, 1.6] n_I$ |

TABLE 2-continued

Relational expressions of the rotation speeds of the output shaft and the input shaft and speed regulation ranges thereof

| Transmission type | Relational expressions of the rotation speeds of the output shaft and the input shaft | | Speed regulation range |
|---|---|---|---|
| Hydraulic single-flow (forward) | $n_o = \dfrac{e}{i_1 i_2 i_5 i_6 (k_2 + 1)} n_I$ | $n_o = 0.8 e n_I$ | $n_o \in [0, 0.8] n_I$ |
| Gear-double ring hybrid (forward) | $n_o = \dfrac{\dfrac{1}{i_1 i_2 i_3 i_4 i_{T1} i_{T2}} + k_1}{k_1 + 1} n_I$ | $n_o = \left(\dfrac{0.4}{i_T} + 0.6\right) n_I$ | $n_o \in [0.7, 2.2] n_I$ |
| Gear-hydraulic hybrid (forward) | $n_o = \dfrac{k_1 k_2 - \dfrac{e}{i_1 i_2 i_5 i_6}}{k_1 k_2 - 1} n_I$ | $n_o = (1.8 - 1.6 e) n_I$ | $n_o \in [0.2, 1.8] n_I$ |
| Double ring-hydraulic hybrid (forward) | $n_o = \dfrac{\dfrac{e}{i_1 i_2 i_5 i_6} + \dfrac{k_2}{i_1 i_2 i_3 i_4 i_{T1} i_{T2}}}{k_2 + 1} n_I$ | $n_o = \left(0.8 e + \dfrac{0.6}{i_T}\right) n_I$ | $n_o \in [0.15, 3.2] n_I$ |
| Gear single-flow (reverse) | $n_o = \dfrac{k_1}{(k_1 + 1) k_3} n_I$ | $n_o = -0.4 n_I$ | $n_o = -0.4 n_I$ |
| Double ring single-flow (reverse) | $n_o = -\dfrac{1}{i_1 i_2 i_3 i_4 i_{T1} i_{T2} (k_1 + 1) k_3} n_I$ | $n_o = -\dfrac{4}{15 i_T} n_I$ | $n_o \in \left[-\dfrac{16}{15}, -\dfrac{1}{15}\right] n_I$ |
| Hydraulic single-flow (reverse) | $n_o = -\dfrac{e}{i_1 i_2 i_5 i_6 (k_2 + 1) k_3} n_I$ | $n_o = -\dfrac{8e}{15} n_I$ | $n_o \in \left[-\dfrac{8}{15}, 0\right] n_I$ |
| Gear-double ring hybrid (reverse) | $n_o = -\dfrac{\dfrac{1}{i_1 i_2 i_3 i_4 i_{T1} i_{T2}} + k_1}{(k_1 + 1) k_3} n_I$ | $n_o = -\dfrac{2}{15}\left(\dfrac{2}{i_T} + 3\right) n_I$ | $n_o \in \left[-\dfrac{22}{15}, -\dfrac{7}{15}\right] n_I$ |
| Gear-hydraulic hybrid (reverse) | $n_o = -\dfrac{k_1 k_2 - \dfrac{e}{i_1 i_2 i_5 i_6}}{k_3 (k_1 k_2 - 1)} n_I$ | $n_o = \dfrac{2}{15}(8 e - 9) n_I$ | $n_o \in \left[-\dfrac{6}{5}, -\dfrac{2}{15}\right] n_I$ |
| Double ring-hydraulic hybrid (reverse) | $n_o = -\dfrac{\dfrac{e}{i_1 i_2 i_5 i_6} + \dfrac{k_2}{i_1 i_2 i_3 i_4 i_{T1} i_{T2}}}{(k_2 + 1) k_3} n_I$ | $n_o = -\dfrac{2}{15}\left(4 e + \dfrac{3}{i_T}\right) n_I$ | $n_o \in \left[-\dfrac{32}{15}, -\dfrac{1}{10}\right] n_I$ |

According to the embodiment in FIG. 1, $i_{T1} = i_1 i_2 i_3$ is a transmission ratio between the input shaft 12 and the double ring series transmission mechanism 2; $i_{TO} = i_4$ is a transmission ratio between the double ring series transmission mechanism 2 and the front planetary gear mechanism sun gear; $i_{H1} = i_1 i_2 i_5$ is a transmission ratio between the input shaft 12 and the hydraulic transmission mechanism 4, and $i_{HO} = i_6$ is a transmission ratio between the output of the hydraulic transmission mechanism and the rear planetary gear mechanism sun gear.

The hydraulic single-flow transmission is adopted for startup, and when $e \in [0, 1]$, $$n_o \in \left[0, \dfrac{1}{i_{HI} i_{HO} (k_2 + 1)}\right] n_I;$$

when $$e = \dfrac{i_{HI} i_{HO} k_1 (k_2 + 1)}{k_1 + 1}$$

and $e \in [0, 1]$, the hydraulic single-flow transmission is configured for being synchronously switched to the gear single-flow transmission; when $$e = \dfrac{i_{HI} i_{HO} (k_2 + 1)}{i_{T1} i_{TO} i_{T1} i_{T2} (k_1 + 1)},$$

$e \in [0, 1]$, and $i_{T1}, i_{T2} \in [0.5, 2.0]$, the hydraulic single-flow transmission is configured for being synchronously switched to the double ring single-flow transmission; when $$e = \dfrac{i_{HI} i_{HO} (k_2 + 1)(1 + k_1 i_{T1} i_{TO} i_{T1} i_{T2})}{(k_1 + 1) i_{T1} i_{TO} i_{T1} i_{T2}},$$

$e \in [0, 1]$, and $i_{T1}, i_T \in [0.5, 2.0]$, the hydraulic single-flow transmission is configured for being synchronously switched to the gear-double ring dual-flow transmission; when $$e = \frac{i_{HI}i_{HO}k_1(k_2+1)}{k_1+1}n_I,$$

the hydraulic single-flow transmission is configured for being synchronously switched to the gear-hydraulic dual-flow transmission; the hydraulic single-flow transmission is configured for being switched to the double ring-hydraulic dual-flow transmission at any point, and in this case, synchronous switching cannot be implemented, but the speed regulation range is expanded;

the double ring single-flow transmission is configured for being switched to the gear-double ring dual-flow transmission at any point, and in this case, synchronous switching cannot be implemented, but the speed regulation range is expanded; when $$e = i_{HI}i_{HO}k_1k_2 - \frac{i_{HI}i_{HO}(k_1k_2-1)}{i_{TI}i_{TO}i_{T1}i_{T2}(k_1+1)},$$

$e \in [0, 1]$, and $i_{T1}, i_{T2} \in [0.5, 2.0]$, the double ring single-flow transmission is configured for being synchronously switched to the gear-hydraulic dual-flow transmission;
when $$\frac{k_1k_2-1}{i_{TI}i_{TO}i_{T1}i_{T2}} + \frac{(k_1+1)e}{i_{HI}i_{HO}} = k_1(k_2+1),$$

$e \in [0, 1]$, and $i_{T1}, i_{T2} \in [0.5, 2.0]$, the gear-double ring dual-flow transmission is configured for being synchronously switched with the gear-hydraulic dual-flow transmission;
when $$\frac{(k_1+1)e}{i_{HI}i_{HO}} + \frac{k_1k_2-1}{i_{TI}i_{TO}i_{T1}i_{T2}} = k_1(k_2+1),$$

$e \in [0, 1]$, and $i_{T1}, i_{T2} \in [0.5, 2.0]$, the gear-double ring dual-flow transmission is configured for being synchronously switched with the double ring-hydraulic dual-flow transmission;
when $$\frac{(k_1+1)e}{i_{HI}i_{HO}} + \frac{(k_1k_2-1)}{i_{TI}i_{TO}i_{T1}i_{T2}} = k_1(k_2+1),$$

$e \in [0, 1]$, and $i_{T1}, i_{T2} \in [0.5, 2.0]$, the gear-hydraulic dual-flow transmission is configured for being synchronously switched with the double ring-hydraulic dual-flow transmission.

Embodiment

The hydraulic single-flow transmission is adopted for startup, and when $e \in [0, 1]$, $n_o \in [0, 0.8]n_I$,
when $e = 0.75$, the hydraulic single-flow transmission is configured for being synchronously switched to the gear single-flow transmission; when $e \cdot i_T = 0.5$, $e \in [0, 1]$, and $i_T \in [0.25, 4]$, the hydraulic single-flow transmission is configured for being synchronously switched to the double ring single-flow transmission; when $$4e = \frac{2}{i_T} + 3,$$

$e \in [0, 1]$, and $i_T \in [0.25, 4]$, the hydraulic single-flow transmission is configured for being synchronously switched to the gear-double ring dual-flow transmission; when $e = 0.75$, the hydraulic single-flow transmission is configured for being synchronously switched to the gear-hydraulic dual-flow transmission; the hydraulic single-flow transmission is configured for being switched to the double ring-hydraulic dual-flow transmission at any point, and in this case, synchronous switching cannot be implemented, but the speed regulation range is expanded;

the double ring single-flow transmission is configured for being switched to the gear-double ring dual-flow transmission at any point, and in this case, synchronous switching cannot be implemented, but the speed regulation range is expanded; when $$\frac{2}{i_T} + 8e = 9,$$

$e \in [0, 1]$, and $i_T \in [0.25, 4]$, the double ring single-flow transmission is configured for being synchronously switched to the gear-hydraulic dual-flow transmission;
when $$\frac{1}{i_T} + 4e = 3,$$

$e \in [0, 1]$, and $i_T \in [0.25, 4]$, the gear-double ring dual-flow transmission, the gear-hydraulic dual-flow transmission, and the double ring-hydraulic dual-flow transmission are configured for being synchronously switched to one another.

The above descriptions are preferred embodiments of the present invention, and are not intended to limit the present invention. Any obvious improvements, replacements, or modifications made by persons skilled in the art without departing from the essence of the present invention shall fall within the protection scope of the present invention.

What is claimed is:

1. A gear-double ring-hydraulic hybrid transmission device, comprising
an input mechanism, a double ring series transmission mechanism, a hydraulic transmission mechanism, an output member, a front planetary gear mechanism, a middle planetary gear mechanism, a rear planetary gear mechanism, a clutch assembly, and a brake assembly, wherein
the front planetary gear mechanism, the middle planetary gear mechanism, and the rear planetary gear mechanism are connected in series,
an output of the double ring series transmission mechanism is connected to the middle planetary gear mechanism, and
the clutch assembly connects the input mechanism to the double ring series transmission mechanism, the hydraulic transmission mechanism, and the front planetary gear mechanism, the clutch assembly connects an output of the hydraulic transmission mechanism to the middle planetary gear mechanism, and the clutch assembly connects an output of the rear planetary gear mechanism to the output member; and the clutch assembly and the brake assembly are configured for providing a continuous transmission ratio between the input mechanism and the output member.

2. The gear-double ring-hydraulic hybrid transmission device according to claim 1, wherein transmission modes comprising gear single-flow transmission, double ring single-flow transmission, hydraulic single-flow transmission, gear-double ring hybrid transmission, gear-hydraulic hybrid transmission, and double ring-hydraulic hybrid transmission are provided between the input mechanism and the output member by adjusting a displacement ratio of the hydraulic transmission mechanism, adjusting a transmission ratio of the double ring series transmission mechanism, and selectively controlling an engagement of the clutch assembly and the brake assembly.

3. The gear-double ring-hydraulic hybrid transmission device according to claim 2, wherein a planet carrier of the front planetary gear mechanism is connected to a planet carrier of the middle planetary gear mechanism, and a sun gear of the front planetary gear mechanism is connected to the output of the double ring series transmission mechanism;

the planet carrier of the middle planetary gear mechanism is connected to a sun gear of the rear planetary gear mechanism, and a ring gear of the rear planetary gear mechanism is connected to the output member;

the clutch assembly comprises a first clutch, a sixth clutch, and a seventh clutch, wherein the first clutch is used for selectively connecting the input mechanism to a ring gear of the front planetary gear mechanism to implement a first synchronous rotation;

the sixth clutch is used for selectively connecting a ring gear of the middle planetary gear mechanism to the sun gear of the front planetary gear mechanism to implement a second synchronous rotation;

the seventh clutch is used for selectively connecting the sun gear of the rear planetary gear mechanism to a planet carrier of the rear planetary gear mechanism to implement a third synchronous rotation;

the brake assembly comprises a second brake and a third brake, wherein the second brake is used for selectively connecting the ring gear of the middle planetary gear mechanism to a fixed member; and the third brake is used for selectively connecting the planet carrier of the rear planetary gear mechanism to a second fixed member;

forward gear single-flow transmission is provided between the input mechanism and the output member by engaging the first clutch, the sixth clutch, the seventh clutch, and the second brake; and reverse gear single-flow transmission is provided between the input mechanism and the output member by engaging the first clutch, the sixth clutch, the second brake, and the third brake.

4. The gear-double ring-hydraulic hybrid transmission device according to claim 3, wherein the clutch assembly further comprises a second clutch and a third clutch, wherein the second clutch and the third clutch are together used for selectively connecting the input mechanism to an input end of the double ring series transmission mechanism to implement a fourth synchronous rotation;

the brake assembly further comprises a first brake, wherein the first brake is used for selectively connecting the ring gear of the front planetary gear mechanism to a third fixed member, forward double ring single-flow transmission is provided between the input mechanism and the output member by adjusting the transmission ratio of the double ring series transmission mechanism and engaging the second clutch, the third clutch, the seventh clutch, and the first brake;

reverse double ring single-flow transmission is provided between the input mechanism and the output member by adjusting the transmission ratio of the double ring series transmission mechanism and engaging the second clutch, the third clutch, the first brake, and the third brake.

5. The gear-double ring-hydraulic hybrid transmission device according to claim 4, wherein the clutch assembly further comprises a fourth clutch and a fifth clutch, wherein the second clutch and the fourth clutch are together used for selectively connecting the input mechanism to an input end of the hydraulic transmission mechanism to implement a fifth synchronous rotation; and the fifth clutch is used for selectively connecting an output end of the hydraulic transmission mechanism to a sun gear of the middle planetary gear mechanism to implement a sixth synchronous rotation;

forward hydraulic single-flow transmission is provided between the input mechanism and the output member by adjusting the displacement ratio of the hydraulic transmission mechanism and engaging the second clutch, the fourth clutch, the fifth clutch, the sixth clutch, the seventh clutch, and the second brake; and reverse hydraulic single-flow transmission is provided between the input mechanism and the output member by adjusting the displacement ratio of the hydraulic transmission mechanism and engaging the second clutch, the fourth clutch, the fifth clutch, the sixth clutch, the second brake, and the third brake.

6. The gear-double ring-hydraulic hybrid transmission device according to claim 5, wherein forward gear-hydraulic hybrid transmission is provided between the input mechanism and the output member by adjusting the displacement ratio of the hydraulic transmission mechanism and engaging the first clutch, the second clutch, the forth clutch, the fifth clutch, the sixth clutch, and the seventh clutch; and reverse gear-hydraulic hybrid transmission is provided between the input mechanism and the output member by adjusting the displacement ratio of the hydraulic transmission mechanism and engaging the first clutch, the second clutch, the fourth clutch, the fifth clutch, the sixth clutch, and the third brake.

7. The gear-double ring-hydraulic hybrid transmission device according to claim 5, wherein forward double ring-hydraulic hybrid transmission is provided between the input mechanism and the output member by adjusting the displacement ratio of the hydraulic transmission mechanism, adjusting the transmission ratio of the double ring series transmission mechanism, and engaging the second clutch, the third clutch, the fourth clutch, the fifth clutch, the sixth clutch, and the seventh clutch; and reverse double ring-hydraulic hybrid transmission is provided between the input mechanism and the output member by adjusting the displacement ratio of the hydraulic transmission mechanism, adjusting the transmission ratio of the double ring series transmission mechanism, and engaging the second clutch, the third clutch, the fourth clutch, the fifth clutch, the sixth clutch, and the third brake.

8. The gear-double ring-hydraulic hybrid transmission device according to claim 4, wherein forward gear-double ring hybrid transmission is provided between the input mechanism and the output member by adjusting the transmission ratio of the double ring series transmission mechanism and engaging the first clutch, the second clutch, the third clutch, and the seventh clutch; and reverse gear-double ring hybrid transmission is provided between the input mechanism and the output member by adjusting the transmission ratio of the double ring series transmission mechanism and engaging the first clutch, the second clutch, the third clutch, and the third brake.

9. The gear-double ring-hydraulic hybrid transmission device according to claim 2, wherein the hydraulic single-flow transmission is configured for being synchronously switched to any one of the gear single-flow transmission, the double ring single-flow transmission, gear-double ring dual-flow transmission, and gear-hydraulic dual-flow transmission; and the hydraulic single-flow transmission is configured for being switched to double ring-hydraulic dual-flow transmission at any point.

10. The gear-double ring-hydraulic hybrid transmission device according to claim 2, wherein the double ring single-flow transmission is configured for being synchronously switched to gear-hydraulic dual-flow transmission, and the double ring single-flow transmission is configured for being switched to gear-double ring dual-flow transmission at any point; and the gear-double ring dual-flow transmission, the gear-hydraulic dual-flow transmission, and double ring-hydraulic dual-flow transmission are configured for being synchronously switched to one another.

* * * * *